United States Patent
Kim et al.

(10) Patent No.: US 9,759,498 B2
(45) Date of Patent: Sep. 12, 2017

(54) CAN-TYPE HEAT EXCHANGER

(71) Applicants: Hyundai Motor Company, Seoul (KR); INZICONTROLS CO., LTD., Siheung-si (KR); KBAUTOTECH CO., LTD., Asan-si (KR)

(72) Inventors: Jaeyeon Kim, Hwaseong-si (KR); Seongwoo Chae, Hwaseong-si (KR); Wanje Cho, Hwaseong-si (KR); Sangyong Rhee, Samcheok-si (KR); Sangwon Lee, Incheon (KR)

(73) Assignees: Hyundai Motor Company, Seoul (KR); INZICONTROLS CO., LTD., Siheung-si (KR); KBAUTOTECH CO., LTD., Asan-si (KR)

( * ) Notice: Subject to any disclaimer, the term of this patent is extended or adjusted under 35 U.S.C. 154(b) by 480 days.

(21) Appl. No.: 14/551,880

(22) Filed: Nov. 24, 2014

(65) Prior Publication Data

US 2015/0316331 A1 Nov. 5, 2015

(30) Foreign Application Priority Data

Apr. 30, 2014 (KR) .................. 10-2014-0052374

(51) Int. Cl.
*F28F 27/02* (2006.01)
*F28F 13/06* (2006.01)
(Continued)

(52) U.S. Cl.
CPC ............. *F28F 27/02* (2013.01); *F01M 5/007* (2013.01); *F16H 57/0415* (2013.01);
(Continued)

(58) Field of Classification Search
CPC ........ F28F 3/08; F28F 7/00; F28F 9/22; F28F 13/00; F28F 13/06; F28F 27/02; F01P 3/00; F01P 9/00; G05D 23/00
(Continued)

(56) References Cited

U.S. PATENT DOCUMENTS 2,512,800 A * 6/1950 Jensen ................... F01M 5/007
165/134.1
2,670,933 A * 3/1954 Bay ........................ F01M 5/007
165/140
(Continued)

FOREIGN PATENT DOCUMENTS

JP 2012-57889 A 3/2012
JP 4939345 B2 3/2012
(Continued)

*Primary Examiner* — Len Tran
*Assistant Examiner* — Gustavo Hincapie Serna
(74) *Attorney, Agent, or Firm* — Morgan, Lewis & Bockius LLP

(57) ABSTRACT

A can type of heat exchanger may include a housing formed as a cylinder, having a mounting space at the inside, and formed with at least one inlet and at least one outlet, a heat dissipation unit mounted in the mounting space of the housing, receiving operating fluids from the inlet, and the operating fluids heat-exchanging with each other, a separating plate separating the mounting space and inside of the mounting portion, and a valve unit, selectively opening and closing the mounting space or a bypass passageway separated by the separating plate using linear displacement which is generated when expansion and contraction occur according to the temperature of the coolant flowing from the inlet, and adjusting flow of the operating fluids.

30 Claims, 11 Drawing Sheets

(51) Int. Cl.
  *F28F 7/00* (2006.01)
  *F28F 3/04* (2006.01)
  *F28F 9/007* (2006.01)
  *F28D 9/00* (2006.01)
  *F01M 5/00* (2006.01)
  *F16H 57/04* (2010.01)
  *F28D 21/00* (2006.01)

(52) U.S. Cl.
  CPC ........... *F28D 9/005* (2013.01); *F28D 9/0012* (2013.01); *F28F 3/044* (2013.01); *F28F 7/00* (2013.01); *F28F 9/0075* (2013.01); *F28F 13/06* (2013.01); *F28D 2021/0089* (2013.01); *F28F 2250/06* (2013.01)

(58) Field of Classification Search
  USPC ........ 165/103, 157, 161, 167, 280, 283, 297
  See application file for complete search history.

(56) References Cited

U.S. PATENT DOCUMENTS

| | | | | |
|---|---|---|---|---|
| 3,440,833 | A * | 4/1969 | Fernandes | F25B 39/04 165/297 |
| 3,754,706 | A * | 8/1973 | Tao | F16H 57/0413 137/491 |
| 7,487,826 | B2 * | 2/2009 | Pineo | F01M 5/00 165/103 |
| 2009/0049832 | A1 * | 2/2009 | Hase | F01N 5/02 60/320 |
| 2010/0206516 | A1 * | 8/2010 | Muller-Lufft | F01M 5/002 165/96 |
| 2013/0061584 | A1 * | 3/2013 | Gerges | F01N 5/02 60/320 |
| 2013/0133875 | A1 * | 5/2013 | Kim | F28F 27/02 165/296 |
| 2013/0140017 | A1 * | 6/2013 | Kim | F28F 27/02 165/299 |
| 2013/0319634 | A1 * | 12/2013 | Sheppard | F28F 27/00 165/96 |
| 2014/0231054 | A1 * | 8/2014 | Martins | F02B 29/0462 165/166 |
| 2014/0251579 | A1 * | 9/2014 | Sloss | F01N 5/02 165/96 |
| 2015/0000869 | A1 * | 1/2015 | Denoual | F28D 9/0062 165/96 |
| 2015/0027673 | A1 * | 1/2015 | De Francisco Moreno | F28F 9/026 165/159 |

FOREIGN PATENT DOCUMENTS

| | | |
|---|---|---|
| KR | 10-0417957 B1 | 10/2003 |
| KR | 10-2013-0065389 A | 6/2013 |
| KR | 10-1274247 B1 | 6/2013 |

* cited by examiner

CAN-TYPE HEAT EXCHANGER

CROSS-REFERENCE TO RELATED APPLICATION

The present application claims priority to Korean Patent Application No. 10-2014-0052374 filed Apr. 30, 2014, the entire contents of which is incorporated herein for all purposes by this reference.

BACKGROUND OF THE INVENTION

Field of the Invention

The present invention relates to a can type of heat exchanger. More particularly, the present invention relates to a can type of heat exchanger for a vehicle which can control temperatures of operating fluids through heat-exchange, improve heat-exchange efficiency, and have reduced weight and size.

Description of Related Art

Generally, a heat exchanger transfers heat from high-temperature fluid to low-temperature fluid through a heat transfer surface, and is used in a heater, a cooler, an evaporator, and a condenser.

Such a heat exchanger re-uses heat energy or controls a temperature of an operating fluid flowing therein for demanded performance. The heat exchanger is applied to an air conditioning system or a transmission oil cooler of a vehicle, and is mounted in an engine compartment.

Since it is difficult to mount the heat exchanger in the engine compartment with restricted space, studies on heat exchangers with smaller size, lighter weight, and higher efficiency have been developed.

A conventional heat exchanger controls the temperatures of the operating fluids according to a condition of a vehicle and supplies the operating fluids to an engine, a transmission, or an air conditioning system. For this purpose, bifurcation circuits and valves are mounted on each hydraulic line through which the operating fluids operated as heating medium or cooling medium passes. Therefore, constituent elements and assembling processes are increased and layout is complicated.

If additional bifurcation circuits and valves are not used, heat exchanging efficiency cannot be controlled according to a flow amount of the operating fluid. Therefore, the temperature of the operating fluid cannot be controlled efficiently.

Further, according to a conventional heat exchanger, size of the heat exchanger should be increased in order to improve heat-exchange efficiency. Further, additional valves for controlling flow of operating fluids should be mounted outside, thus constituent elements are complicated and weight and cost are increased. Accordingly, when the heat exchanger is mounted in the engine compartment, layout is complicated and mounting space of the elements is not sufficient.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a can type of heat exchanger for a vehicle having advantages of simultaneously warming and cooling operating fluids according to temperatures or flow amounts of the operating fluids in a running state or an initial starting condition of the vehicle when the operating fluids are heat exchanged with each other in the heat exchanger.

Various aspects of the present invention are directed to providing a can type of heat exchanger formed as a can shape that can control temperature of the operating fluids by an operation of a valve unit, improve heat-exchange efficiency, reduce weight and size, simplify an engine layout, and easily obtain mounting space, thus improving installability.

According to various aspects of the present invention, a can type of heat exchanger may include a housing formed as a cylinder with one side closed and another side opened, having a mounting space at the inside, integrally formed with a mounting portion provided in a lateral side of the housing and connected with the mounting space, and formed with at least one inlet and at least one outlet provided in the closed one side and the lateral side respectively, of the housing, a heat dissipation unit mounted in the mounting space of the housing, provided with connecting lines alternately formed by stacking a plurality of plates, one of the connecting lines connected to the mounting space, receiving operating fluids from the inlet, and the operating fluids heat-exchanging with each other, a separating plate separating the mounting space and inside of the mounting portion, connected to the inlet formed on the mounting portion and the outlet formed on the lateral side of the housing, and forming a bypass passageway in addition to the connecting line of the heat dissipation unit, and a valve unit that is mounted at the inlet formed in the mounting portion and penetrates the separating plate in the mounting portion, selectively opening and closing the mounting space or the bypass passageway separated by the separating plate using linear displacement which is generated when expansion and contraction occur according to temperature of the coolant flowing from the inlet, and adjusting flow of the operating fluids.

The inlet may include a first inlet formed at the housing and a second inlet formed at the mounting portion, and the outlet includes a first outlet formed at the housing and separated from the first inlet, and a second outlet formed at the lateral side of the housing and separated from the second inlet.

The first inlet and the first outlet may be respectively formed on the second inlet and the second outlet in alternate positions.

Each plate of the plurality of plates may be formed with a disk shape corresponding to the housing, and one side corresponding to the separating plate is formed with a linear shape.

In each plate of the plurality of plates, first and second connecting holes may be formed corresponding to the first inlet and the first outlet.

In each plate of the plurality of plates, a plurality of protrusions may protrude at predetermined intervals, and a distributing protrusion may be formed from a center of Each plate of the plurality of plates to an exterior circumference toward the separating plate.

Each protrusion of the plurality of protrusions may be formed with a hemisphere shape, and may protrude in a same direction as the distributing protrusion.

The valve unit may include an outer case inserted into the second inlet from outside of the mounting portion, the outer case having a fixing member of which a mounting groove is integrally formed to an interior surface of the second inlet thereof, and is mounted to an external side of the mounting portion at an opposite side of the second inlet, an insert portion integrally formed to the fixing member, at least one first opening formed along a length direction corresponding to the mounting space separated by the separating plate, and at least at least one bypass hole formed corresponding to the bypass passageway.

The valve unit may further include a fixing rod inserted into the outer case and of which one end is fixed to the mounting groove of the fixing member, a deformable member inserted to the fixing rod, and moved on the fixing rod by expansion or contraction according to a change of temperature of the operating fluids, an inner case of which at least one second opening is formed along a length direction thereof corresponding to the first opening of the outer case, and which is slidably inserted into the outer case, a flange member which is fixed to a lower portion of the inner case in the inner case, and fixed to a lower portion of the deformable member, a stopper which is fixed to the insert portion from an opposite side of the fixing member of the outer case, and an elastic member which is interposed between the deformable member and the stopper, is compressed when the deformable member is expanded, and supplies elastic force to the deformable member.

The fixing member of the outer case may be fixed to the heat dissipation unit though a snap ring of an end cap that is mounted at an external surface of the heat dissipation unit.

The outer case may be a cylinder of which an upper end thereof is opened.

The bypass hole and the first opening may be formed apart from each other along a length direction of the outer case at a predetermined angle.

The first openings may be formed apart from the bypass hole at a lower portion of the outer case along a length direction of the outer case.

The inner case may be a cylinder of which both ends are opened.

The second openings may be formed to be misaligned along the length direction of the inner case at a predetermined angle from each other.

The inner case may be moved toward the second inlet by expansion of the deformable member in the outer case so that the second opening is positioned at the first opening to open the first opening and close the bypass hole by the inner case.

The inner case may be initially assembled as the first opening is closed by the inner case and the second opening is closed by the outer case.

The deformable member may be a wax material which is expanded or contracted according to the temperature of the operating fluids.

Flow holes may be formed to an exterior circumference of the flange member with a predetermined angle.

An exterior circumference of the flange member may be fixed to an interior circumference of the inner case, and a mounting portion formed to a center thereof may be fixed to the deformable member through a fixing ring.

At least one penetration hole may be formed to the stopper for the operating fluid to flow within the valve unit.

The penetration holes may be formed to a center and along a circumference of the stopper.

A fixing end may be formed to protrude to the stopper for the elastic member to be fixed under the stopper.

A receiving portion, where the stopper is received, may be formed to the outer case.

A ring groove may be formed to an upper and interior circumference of the outer case for a stopper ring to be received thereto for fixing the upper portion of the stopper.

One end of the elastic member may be supported by the stopper and another end thereof may be supported by the deformable member, and the elastic member may be a coil spring.

One of the operating fluids may be a coolant flowing from a radiator, and another operating fluid may be transmission oil flowing from an automatic transmission.

The transmission oil may flow through the first inlet, the first outlet, and the heat dissipation unit, the coolant flows through the second inlet and the second outlet, and the connecting lines may include a first connecting line in which the transmission oil flows and a second connecting line in which the coolant flows.

One end of the separating plate positioned at the mounting space may be bent at a predetermined angle from another end of the separating plate positioned at the mounting portion.

In the separating plate, a penetration hole may be formed corresponding to the heat dissipation unit.

A cover closing the mounting space may be disposed on the housing.

According to the present invention, the can type of heat exchanger warms or cools operating fluids according to temperatures or flow amounts of the operating fluids flowing in a running state or an initial starting condition of the vehicle when the temperature of the operating fluids are controlled in the heat exchanger through the heat exchange.

Further, it is possible to control the temperatures of the operating fluids by an operation of the valve unit according to the vehicle condition. Since the heat exchanger is formed with a can shape that can improve efficiency of heat exchange and reduce weight and size, it is possible to simplify an engine layout, and it is easy to obtain a mounting space, thereby installability is improved.

The valve unit applied with the deformable member such as the wax material which is expanded or contracted according to the flowed operating fluid may selectively supply the operating fluids, thus flow of the operating fluids can be correctly controlled.

Since the valve unit is mounted as the can type of heat exchanger, additional control valves and bifurcation circuits for controlling flow of the operating fluids can be removed. Therefore, manufacturing cost may be reduced and workability may be improved.

If the operating fluid is the transmission oil in the automatic transmission, hydraulic friction during cold starting may be lowered due to fast warm-up. In addition, slip may be prevented and durability may be maintained while driving due to excellent cooling performance. Therefore, fuel economy and durability of the transmission may be improved.

Further, since valve responsiveness of opening and closing according to the temperature of the operating fluids is improved, commercial value is improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
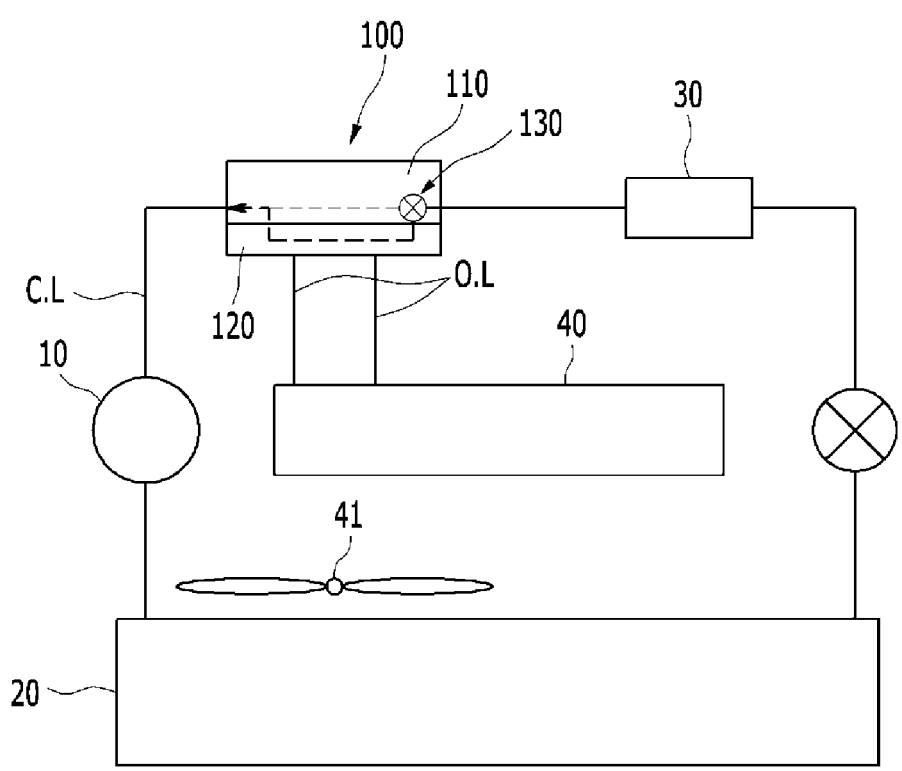
FIG. 1 is a schematic diagram of an exemplary cooling system of an automatic transmission to which a can type of heat exchanger for a vehicle according to the present invention is applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Throughout the specification and the claims, unless explicitly described to the contrary, the word "comprise" and variations such as "comprises" or "comprising" will be understood to imply the inclusion of stated elements but not the exclusion of any other elements.

In addition, "unit", "means", "part", "member", or the like, which is described in the specification, means a unit of a comprehensive configuration that performs at least one function or operation.

Referring to the drawings, a can type of heat exchanger 100 according various embodiments of the present invention applies to a cooling system of an automatic transmission.

As shown in FIG. 1, the cooling system of the automatic transmission is provided with a cooling line for cooling an engine. A coolant passes through a radiator 20 having a cooling fan 41 through a water pump 10 and is cooled by the radiator 20. A heater core 30 connected to a heating system of the vehicle is mounted at the cooling line.

The can type of heat exchanger 100 according to various embodiments of the present invention warms or cools operating fluids according to temperatures or flow amounts of the operating fluids flowing in a running state or an initial starting condition of the vehicle when the temperature of the operating fluids are controlled in the heat exchanger 100 through heat exchange.

Further, it is possible to control the temperature of the operating fluids by an operation of a valve unit 130 according to the vehicle condition. Since the heat exchanger 100 is formed with a can shape that can improve efficiency of heat exchange and reduce weight and size, it is possible to simplify an engine layout. It is also easy to obtain mounting space, thereby installability is improved.

The can type of heat exchanger 100 according to various embodiments of the present invention is disposed between the water pump 10 and heater core 30, and is connected to an automatic transmission 40 through an oil line (hereinafter "O.L")

In various embodiments of the present, the operating fluids include a coolant flowing from the radiator 20, and transmission oil flowing from the automatic transmission 40. The can type of heat exchanger 100 causes the transmission oil to exchange heat with the coolant such that temperatures of the transmission oil and the engine oil are controlled.

Figure 2:
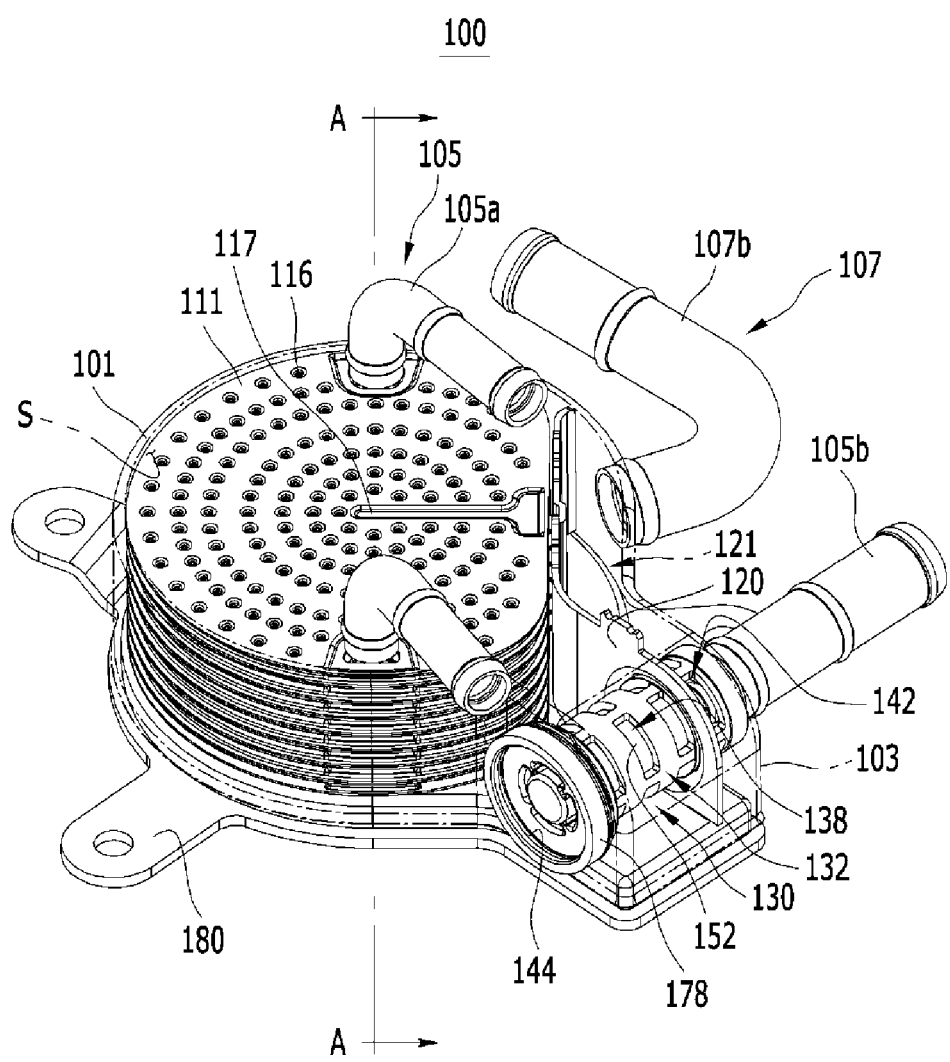
FIG. 2 is a perspective projection view of the exemplary can type of heat exchanger according to the present invention.
Figure 3:
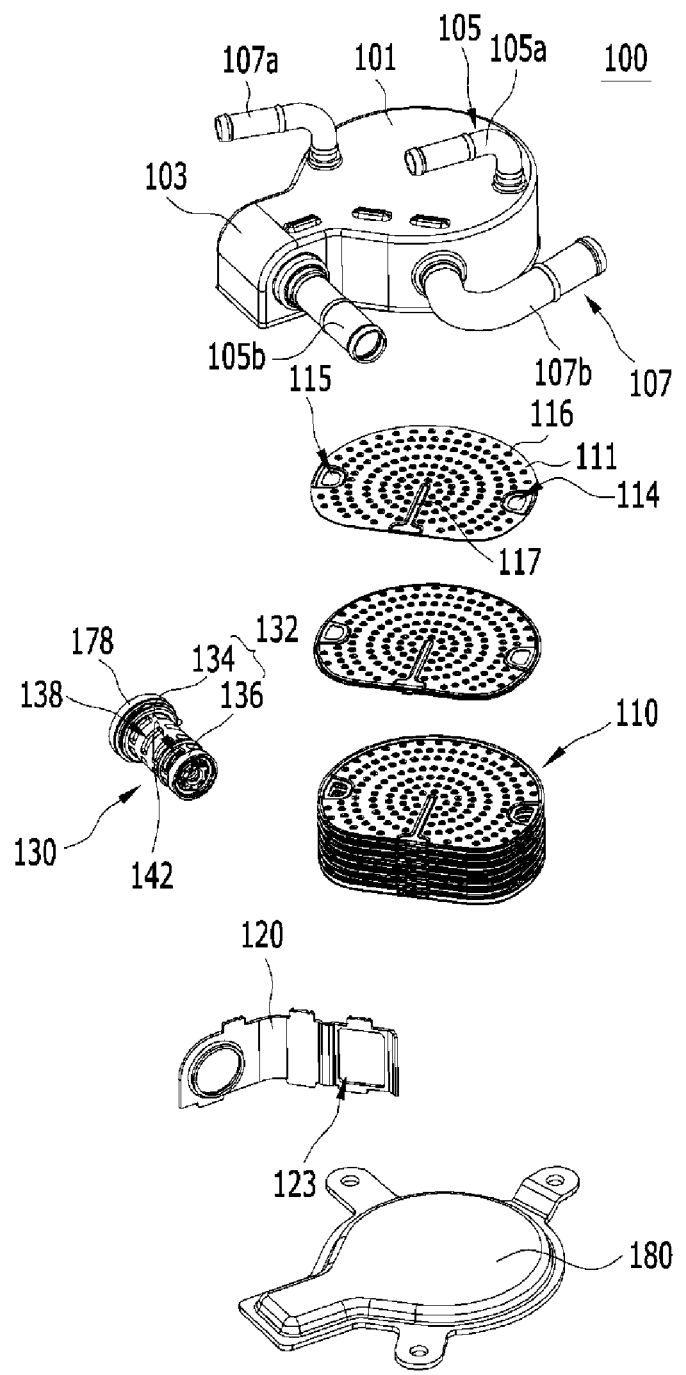
FIG. 3 is an exploded perspective view of an exemplary can type of heat exchanger according to the present invention.
Figure 4:
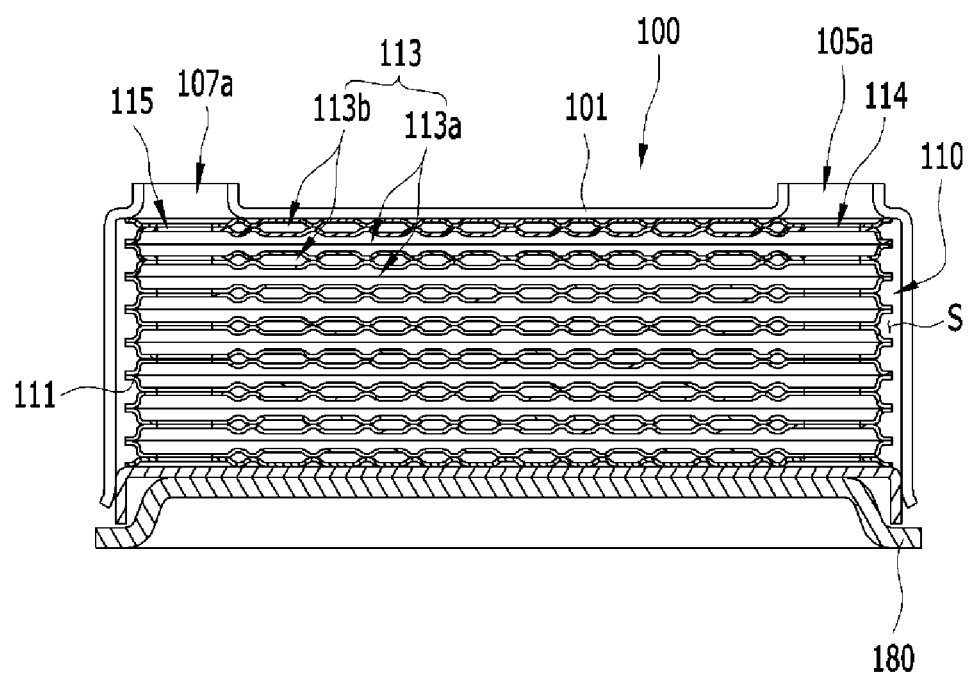
FIG. 4 is a cross-sectional view taken along the line A-A of FIG. 2.

As shown in FIG. 2, FIG. 3 and FIG. 4, the can type of heat exchanger 100 may include a housing 101, a heat dissipation unit 110, a separating plate 120, and the valve unit 130.

The housing 101 is formed to be cylindrical, with one side closed and the other side opened, such that a mounting space (S) is formed in the housing 101.

A mounting portion 103 connecting to the mounting space (S) is integrally formed at a lateral side of the housing 101, and at least one inlet 105 and at least one outlet 107 are formed in the closed one side and the lateral side.

The inlet 105 may include a first inlet 105a formed in the closed side of the housing 100, and a second inlet 105b formed in the lateral side of the housing 100.

The outlet 107 may include a first outlet 107a formed in the closed side of the housing 100, and a second outlet 107b formed in the lateral side of the housing 100. The outlet 107 is disposed to be apart from the first inlet 105a and the second outlet 107b is disposed to be apart from the second inlet 105b.

The first inlet 105a and the first outlet 107a may be alternately disposed with the second inlet 105b and the second outlet 107b.

That is, the transmission oil may flow through the first inlet 105a, the first outlet 107a, and the heat dissipation unit 110, and the coolant may flow through the second inlet 105b and the second outlet 107b.

In various embodiments of the present invention, the heat dissipation unit 110 is mounted in the mounting space (S) of the housing 101, and connecting lines are alternately formed by stacking a plurality of plates 111.

One connecting line 113 is connected to the mounting space (S), and the transmission oil and the coolant supplied from the first and second inlets 105a and 107a are heat-exchanged with each other.

That is, when the transmission oil flows from the first inlet 105a and circulates in the coolant unit 110, the transmission oil and the coolant flowing into the mounting space (S) of the housing 101 flow in opposite directions to each other by counterflow of the transmission oil and the coolant.

The connecting line 113 may include a first connecting line 113a in which the transmission oil flows, and a second connecting line 113b through which the coolant flows into the mounting space (S).

The plate 111 may be formed with a disk shape corresponding to the housing 101, and one side of the plate 111 may be formed with a linear shape corresponding to the separating plate 120.

First and second connecting holes 114 and 115 are formed in the plate 111 corresponding to the first inlet 105a and the first outlet 107a.

The transmission oil flowing from the first inlet 105a flows into the heat dissipation unit 110 through the first connecting hole 114, passes through the connecting line 113, and exhausts to the first outlet 107a through the second connecting hole 115.

Figure 5:
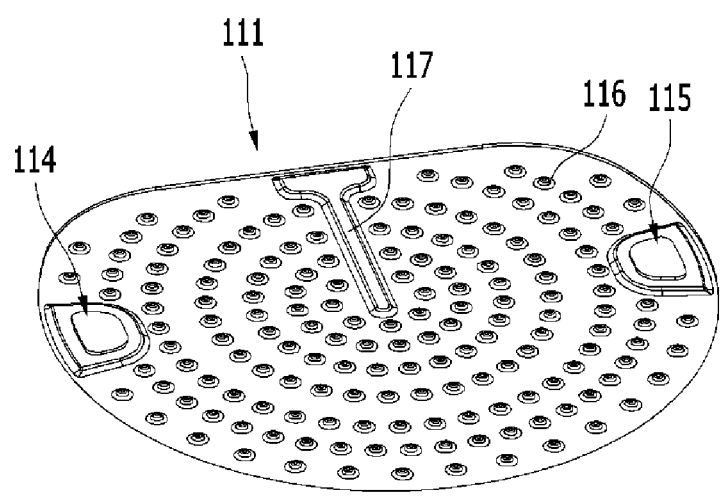
FIG. 5 is a perspective view of a plate of a heat dissipation unit applied to the exemplary can type of heat exchanger according to the present invention.

As shown in FIG. 5, in the plate 111, a plurality of protrusions 116 are protruded by a predetermined distance, and a distributing protrusion 117 is formed from the center of the plate 111 to an exterior circumference toward the separating plate 120.

Each of the protrusions 116 may be formed with a hemispherical shape, may be protruded in the same direction as the distributing protrusion, and may be formed in plural from the center of the plate 111 to the exterior circumference in a circumference direction.

When the plates 111 are stacked, the protruded parts of the protrusion 116 and the distributing protrusion 117 are connected with each other.

Since two assembled plates 111 of which each protrusion 116 contacts each distributing protrusion 117 are stacked in plural, the first connecting line 113a and the second connecting line 113b are alternately formed.

Here, the protrusion generates flow resistance to the transmission oil passing through the first connecting line 113a of the heat dissipation unit 110 and the coolant passing through the second connecting line 113b, such that heat exchange efficiency is improved.

Further, the distributing protrusion 117 evenly distributes flow of each operating fluid in order to increase a flow distance that the transmission oil passing through the first and second connecting lines 113a and 113b and the coolant flow, such that each operating fluid evenly flows by the entire region of the plate 111 of the heat dissipation unit 110.

In various embodiments of the present invention, the separating plate 120 separates the inside of the mounting space (S) and the mounting portion 103, is connected to the second inlet 105b of the mounting portion 103 and the second outlet 107b of the lateral side of the housing 101, and is provided with a bypass passageway 121 separately from the connecting line 113 of the heat dissipation unit 110.

In order to separate a part of the mounting space (S), one end of the separating plate 120 positioned at the mounting space (S) may be bent at a predetermined angle from the other end of the separating plate 120 positioned at the mounting portion 103.

In the separating plate 120, a penetration hole 123 may be formed corresponding to the heat dissipation unit 120.

The penetration hole 123 connects between the second connecting line 113b and the second outlet 107b through the bypass passageway 121, such that the coolant exhausts outside of the heat exchanger 100 after the coolant flowing into the mounting space (S) separated by the separating plate 120 passes through the second connecting line 113b of the heat dissipation unit 110.

That is, the coolant passing through the second connecting line 113b is exhausted to the bypass passageway 121 through the penetration hole 123 of the separating plate 120, and is exhausted outside of the housing 101 through the second outlet 117b.

Meanwhile, according to various embodiments, the transmission oil flows in and is exhausted through the first inlet 105a and the first outlet 107a. The coolant flowing through the second inlet 105b selectively operates the valve unit 130, and flows in the second connecting line 113b in the mounting space (S). However, flow of the coolant and the transmission oil may be changed.

The valve unit 130 is mounted at the mounting portion 103 passing through the separating plate 120 corresponding to the second inlet 105b.

The valve unit 130 selectively opens and closes the mounting space (S) separated by the separating plate 120 or the bypass passageway 121 using linear displacement which is generated when expansion and contraction occur according to the temperature of the coolant flowing from the second inlet 105b. Therefore, the flowing of the coolant may be adjusted.

Figure 6:
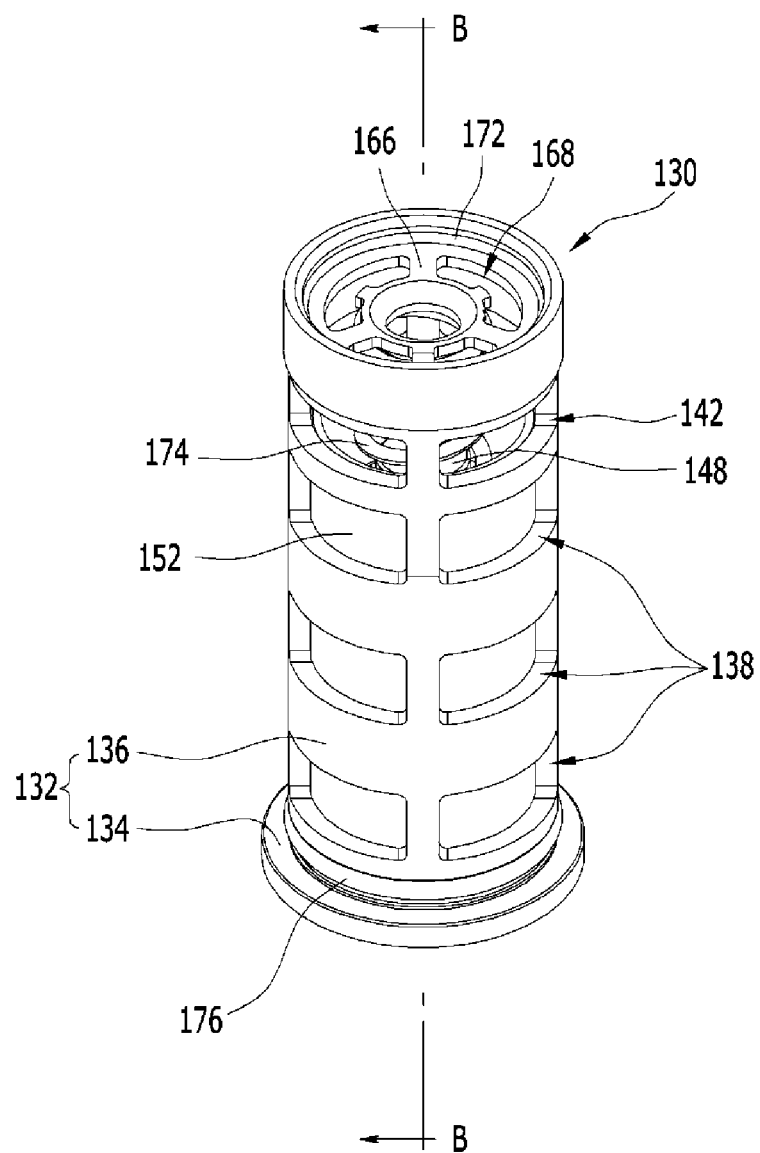
FIG. 6 a perspective view of a valve unit applied to the exemplary can type of heat exchanger according to the present invention.
Figure 7:
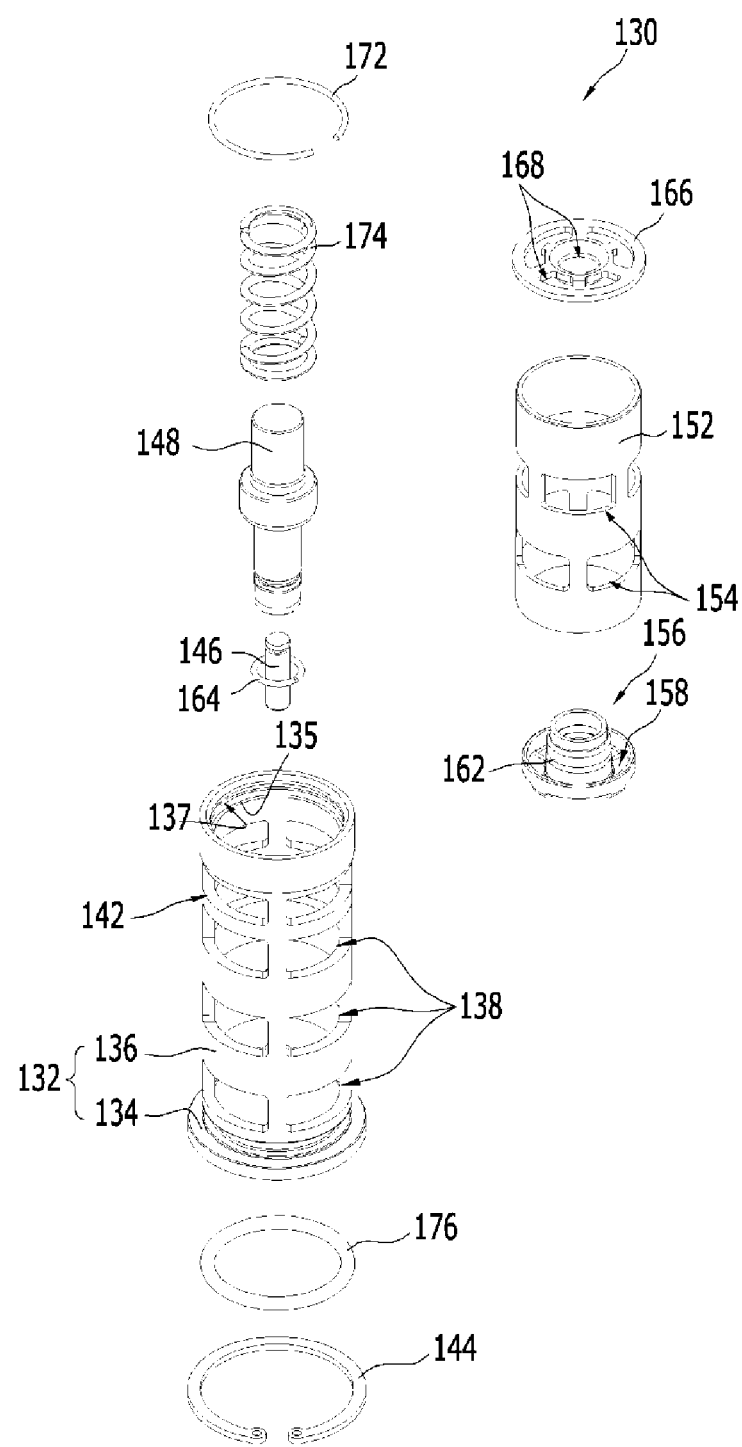
FIG. 7 is an exploded perspective view of the valve unit applied to the exemplary can type of heat exchanger according to the present invention.
Figure 8:
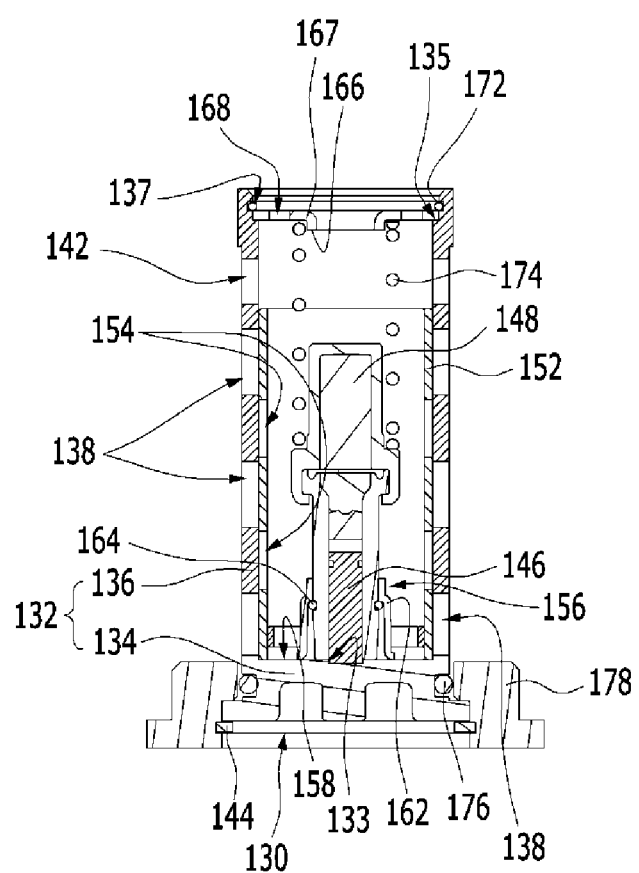
FIG. 8 is a cross-sectional view taken along the line B-B of FIG. 6.

As shown in FIG. 6, FIG. 7 and FIG. 8, the valve unit 130 includes an outer case 132, a fixing rod 146, a deformable member 148, an inner case 152, a flange member 156, a stopper 166, and an elastic member 174.

The outer case 132 is inserted into the second inlet 105b from outside of the mounting portion 103.

The outer case 132 includes a fixing member 134 of which a mounting groove 133 is integrally formed to an interior surface of the second inlet 105b thereof, and is mounted to an external side of the mounting portion 103 at an opposite side of the second inlet 105b, and an insert portion 136 integrally formed from the fixing member 134 toward the second inlet 105b.

The insert portion 136 is formed with a cylinder shape, at least one first opening 138 is formed along a length direction corresponding to the mounting space (S) separated by the separating plate 120, and at least one bypass hole 142 is formed corresponding to the bypass passageway 121.

The bypass holes 142 and the first openings 138 are formed apart from each other along the length direction of the outer case 132 with a predetermined angle. In various embodiments, 4 bypass holes 142 and first openings 138 are formed at 90° from adjacent bypass holes 142 or first openings 138 along the exterior circumference of the insert portion 136, but are not limited thereto.

The first openings 138 are formed apart and under the bypass holes 142 and along the length direction of the outer case 132.

The fixing member 134 of the outer case 132 is fixed to the heat dissipating unit 110 though a snap ring 144 of an end cap 178 that is mounted at an external surface of the heat dissipating unit 110.

The outer case 132 may be a cylinder of which the end of the insert portion 136 forward of the second inlet 105b is opened.

In various embodiments, the fixing rod 146 is inserted into the outer case 132, and a lower end thereof is fixedly mounted to the mounting groove 133 of the fixing member 134.

The fixing rod 146 is mounted perpendicular to the fixing member 134 from the mounting groove 133 of the fixing member 134 toward the second inlet 105b.

The deformable member 148 is inserted into an upper portion of the fixing rod 146, and the position of the deformable member 148 is changed forward and rearward on the fixing rod 146 according to expansion or contraction of the deformable material filled within the deformable member 148 affected by the temperature of the operating fluid.

The deformable material may be a wax material that is expandable and contractible according to the temperature of the operating fluid.

The wax material may be a thermal expansion material that is influenced by temperature.

The deformable member 148 is an assembly filled with the wax material. When the volume of the wax material is changed according to the temperature, the deformable member 148 is moved up or down on the fixing rod 146 without a change of appearance.

If the coolant with a relatively high temperature flows through the second inlet 105*b*, the deformable member 148, by the expansion of the wax material filled therein according to an increment of temperature, moves forward on the fixing rod 146.

On the contrary, if the coolant with a relatively low temperature flows through the first inlet 105*a*, the deformable member 148, by the contraction of the wax material filled therein according to a decrement of temperature, moves rearward on the fixing rod 146.

If the coolant with a relatively low temperature flows through the first inlet 105*a* when the deformable member 148 is positioned at an initial state, the deformable member is not moved upward or downward because the volume of the wax material is not changed.

In various embodiments, at least one second opening 154 is formed to the inner case 152 along the length direction thereof corresponding to the first opening 138 of the outer case 132, and the inner case 152 is slidable in the outer case 132.

The inner case 152 has a cylinder shape of which both ends are opened.

The second openings 154 are formed to be misaligned along the length direction of the inner case 152 corresponding to the first opening 138 with a predetermined angle from each other.

In the drawings, 4 second openings 154 are formed to upper and lower portions of the exterior circumference of the inner case 152 at 90° from adjacent second openings 154, but are not limited thereto.

In various embodiments, the flange member 156 is connected to the interior circumference of the inner case 152, and a center thereof is fixed to the lower portion of the deformable member 148.

The flange member 156 may be integrally formed with the inner case 152, and fixes the inner case 156 that is slidable in the outer case 132 to the lower portion of the deformable member 148.

Flow holes 158 may be formed to the exterior circumference of the flange member 156 with a predetermined angle.

For example, four flow holes 158 may be formed to the exterior circumference of the flange member 156 at 90°, and the operation fluid flowing through the second inlet 105*b* may flow to the second connecting line 113*b* of the heat dissipation unit 110 via the second opening 154 in the inner case 152.

The exterior circumference of the flange member 156 is fixed to the interior circumference of the inner case 152, and a mounting portion 162 formed to the center thereof is fixed to the deformable member 148 through a fixing ring 164.

In various embodiments, the inner case 152 moves forward with the deformable member 148 within the outer case 132 by the flange member 156 when the deformable member 148 expands.

In this case, the second openings 154 of the inner case 152 are positioned corresponding to the first openings 138 so as to open the first openings 138, and the upper portion of the inner case 152 closes the bypass hole 142.

The inner case 152 may be assembled, initially, as the second opening 154 are closed by a closed section between the first openings 138, and thus the first openings 138 are closed, and the upper portion of the inner case 152 is positioned under the bypass hole 142 so as to open the bypass hole 142.

In various embodiments, the stopper 166 is fixed to the insert portion 136 from the opposite side of the fixing member 134 of the outer case 132.

At least one penetration hole 168 may be formed to the upper portion of the stopper 166 for the operating fluid flowing through the second inlet 105*b* to flow within the valve unit 130 to transform the deformable member 148.

In the drawings, the penetration holes 168 are formed to the center of the stopper 166 and 3 penetration holes 168 are formed along the circumferential direction at 120°, but they are not limited thereto.

The stopper 166 is mounted to the insert portion 136 of the outer case 132, and the coolant flowing through the second inlet 105*b* flows in the outer case 132.

A receiving portion 135, where the stopper 166 is received, is formed to the upper portion of the outer case 132.

The receiving portion 135 is formed along the interior circumference of the outer case 132 and protrudes toward the center of the outer case 132.

A ring groove 137 is formed to the upper and interior circumference of the outer case 132 for a stopper ring 172 to be received thereto for fixing the upper portion of the stopper 166.

The stopper 166 is disposed to the receiving portion 135 of the outer case 132 and is fixed by the stopper ring 172 mounted to the ring groove 137.

The elastic member 174 is interposed between the deformable member 148 and the stopper 166, is compressed when the deformable member 148 is expanded, and thereby supplies elastic force to the deformable member 148.

One end of the elastic member 174 is supported by the stopper 166 and the other end thereof is supported by the deformable member 148, and the elastic member 174 may be a coil spring.

Thus, the elastic member 174 is compressed when the deformable member 148 moves forward on the fixing rod 146.

On the contrary, when the deformable member 148 is compressed, compression of the elastic member 174 is released and the elastic member 174 supplies elastic force to the deformable member 148 such that the deformable member 148 rapidly returns to the original position.

A fixing end 167 is formed to protrude to the stopper 166 for the elastic member 174 to be fixed under the stopper 166.

One end of the fixing end 167 is inserted into the interior circumference of the elastic member 174, and thereby the other end of the fixing end 167 stably supports the elastic member 174.

In the drawings, each of the four first and second openings 138 and 154, bypass holes 142, flow holes 158, and penetration holes 168 are formed at 90° along the circumferential direction. However they are not limited thereto, and on the contrary, positions and numbers of each of the openings 138 and 154, bypass hole 142, flow hole 158, and penetration hole 168 may be varied.

A seal ring 176 may be disposed between the end cap 178 provided to the mounting portion 110 and the fixing member 134 of the outer case 132 for the operating fluid, for example the coolant, flowing within the housing 101 to not leak out except at the second outlet 107b, and also to not leak out between the end cap 178 and the fixing member 134.

That is, the seal ring 176 seals between the exterior circumference of the fixing member 134 and the end cap 178 provided to the mounting portion 103, and thereby prevents the coolant from leaking along the exterior circumference of the fixing member 134 of the outer case 132.

Figure 9:
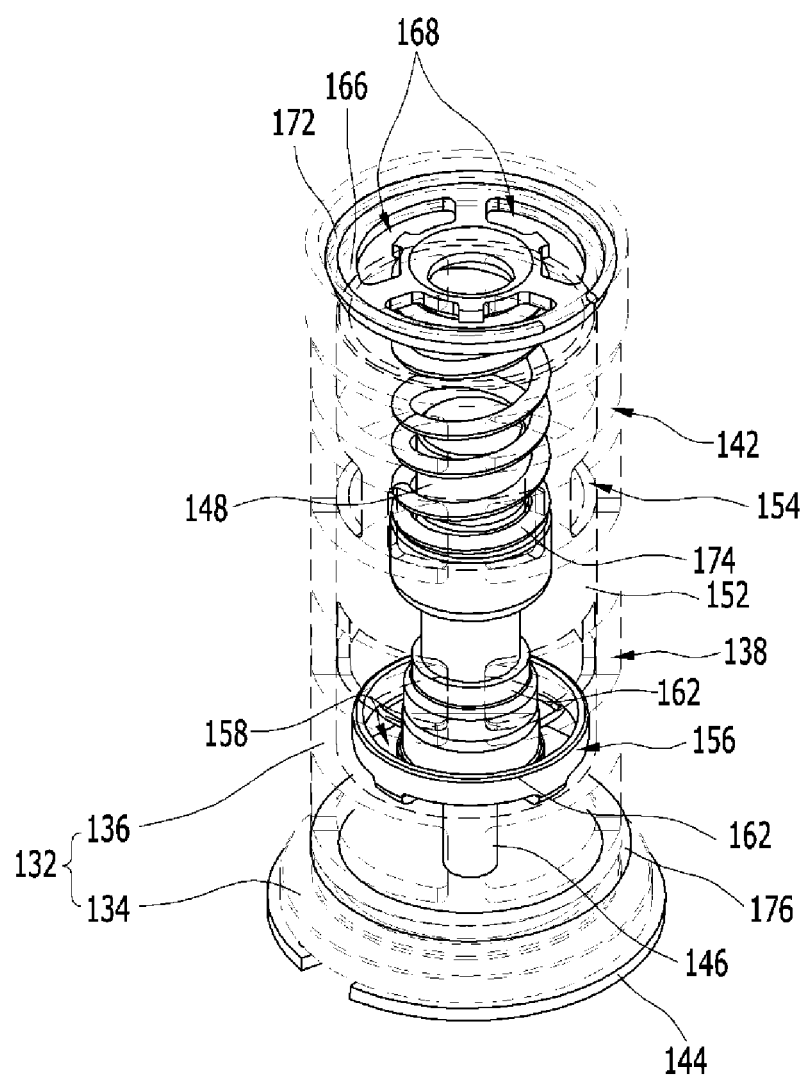
FIG. 9 is a drawing for describing operation of the valve unit applied to the exemplary can type of heat exchanger according to the present invention.

FIG. 9 is a drawing for describing operation of a valve unit applied to a can type of heat exchanger according to various embodiments of the present invention.

As shown in FIG. 9, the operating fluid at a predetermined temperature flows through the second inlet 105b, and the operating fluid flows into the outer case 132 and the inner case 152 through the penetration hole 168 of the stopper 166.

Then, the deformable member 148 moves forward on the fixing rod 146 by the expansion of the wax material within the deformable member 148.

Thus, the flange member 156 fixed to the lower portion of the deformable member 148 moves forward together with the deformable member 148. Simultaneously, the inner case 152 slides toward the second inlet 105b with the flange member 156 within the outer case 132.

In this case, the elastic member 174 is compressed, and simultaneously the bypass hole 142 is closed by the inner case 152.

The second openings 154 are positioned corresponding to the first openings 138. Simultaneously, the first openings 138 positioned at the fixing member 134 of the outer case 132 are opened by the rising inner case 152, and the coolant flows into the mounting space (S) of the housing 101 and passes through the second connecting line 113b.

If the operating fluid with a temperature below a predetermined temperature flows into the second inlet 105b, the deformable member 148 moves downward on the fixing rod 146.

In this case, the elastic member 174 supplies elastic force to the deformable member 148 such that the deformable member 148 rapidly returns to the original position.

Then the inner case 152 moves backward together with the flange member 156 fixed to the deformable member 148, and thus the bypass holes 142 are opened and simultaneously the first openings 138 are closed.

In the various embodiments, a cover 180 closing the mounting space (S) may be disposed to the housing 101, and the cover 180 prevents the coolant flowing into the mounting space (S) from leaking outside.

Hereinafter, functions and operations of the can type of heat exchanger 100 according to various embodiments of the present invention will be described.

FIG. 10A, FIG. 10B, FIG. 11A, and FIG. 11B are drawings for describing operation of a can type of heat exchanger for a vehicle according to various embodiments of the present invention.

Figure 10A:
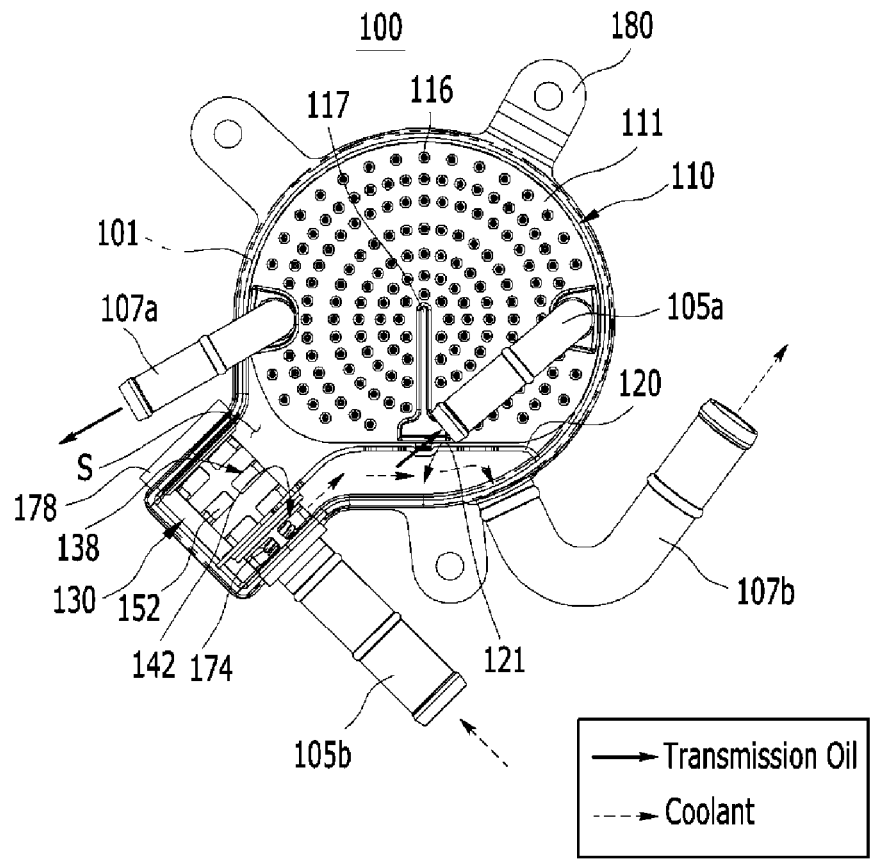
FIG. 10A and FIG. 10B are drawings for describing operation of the exemplary can type of heat exchanger for a vehicle according to the present invention.
Figure 10B:
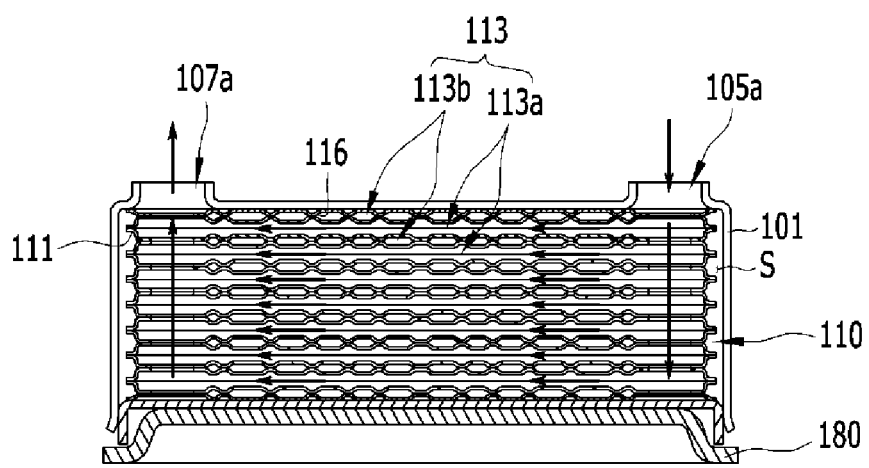

As shown in FIG. 10A and FIG. 10B, if the temperature of the coolant flowing into the second inlet 105b is lower than a predetermined temperature, the deformable member 148 maintains the initial position since the temperature of the coolant flowing into the penetration hole 168 of the stopper 166 is lower than a temperature at which the deformable member 148 is deformed.

Since the deformable member 148 does not move forward on the fixing rod 146, the inner case 152 also maintains the initial position (referring to FIG. 6), and the bypass hole 142 of the outer case 132 is opened.

As described above, since the closed portion of the inner case 152 closes the first openings 138 and the second openings 154 are positioned at the closed portion of the outer case 132, the outer case 132 and the inside of the inner case 152 are closed.

Thus, the coolant flowing into the housing 101 is prevented from flowing into the second connecting line 113b.

The coolant flows from the valve unit 130 through the opened bypass hole 142 and the bypass passageway 121, and flows out through the second outlet 107b. At this time, the coolant does not flow in the heat dissipation unit 110.

Accordingly, the coolant does not flow into the second connecting line 113b of the heat dissipation unit 110, so the coolant does not exchange heat with the transmission oil that flows through the first inlet 105a and passes through the first connecting line 113a of the heat dissipation unit 110.

If the transmission oil should be warmed up according to a condition or a mode of the vehicle such as a running state, an idle mode, or initial starting, the bypass passageway 121 prevents the low temperature coolant from flowing into the second connecting line 113b. Therefore, lowering of the temperature of the transmission oil through heat exchange with the coolant is prevented.

Figure 11A:
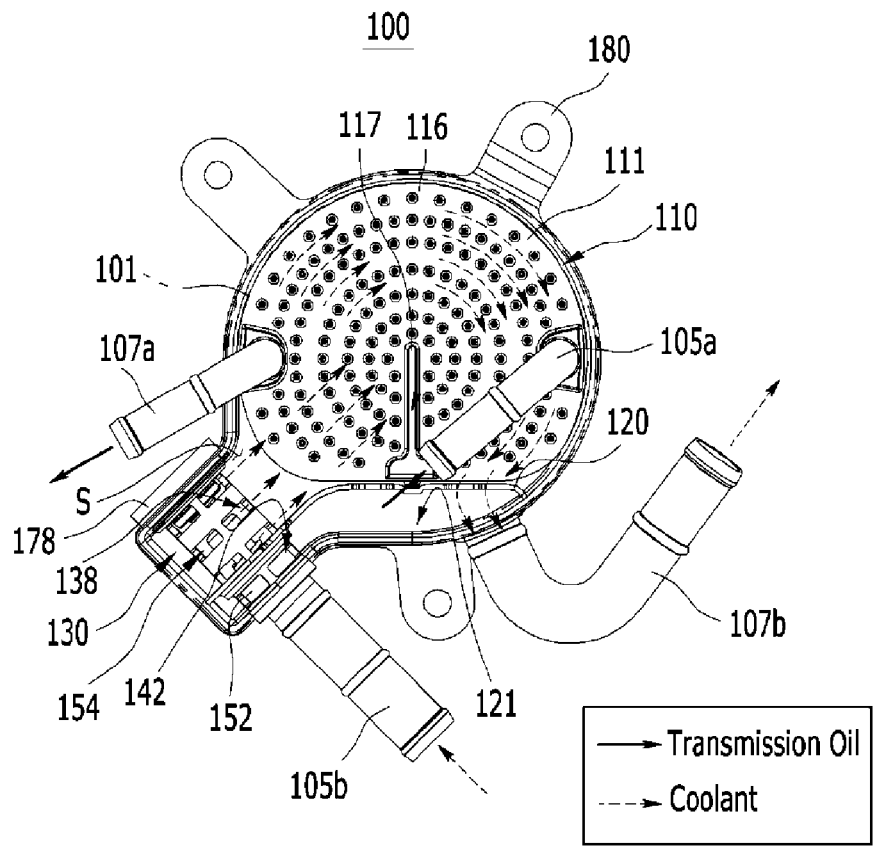
FIG. 11A and FIG. 11B are drawings for describing operation of the exemplary can type of heat exchanger for a vehicle according to the present invention.
Figure 11B:
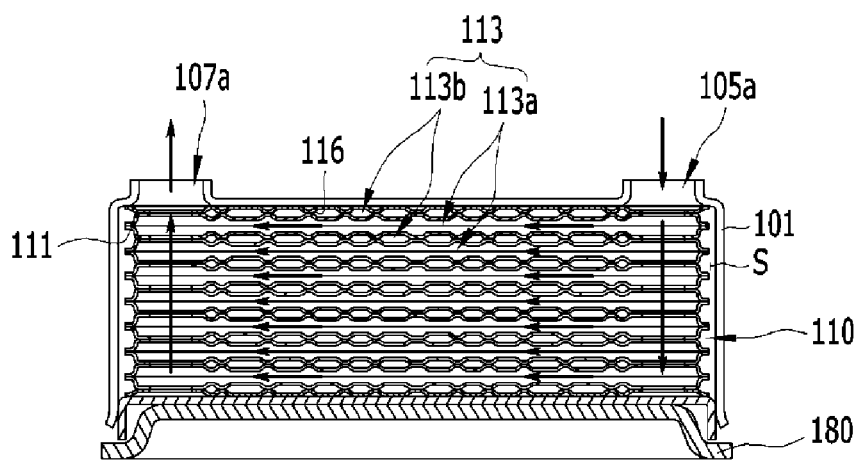

On the contrary, if the temperature of the coolant is higher than the predetermined temperature, the deformable member 148 of the valve unit 130 moves forward on the fixing rod 146, as shown in FIG. 11A and FIG. 11B, by the coolant flowing through the penetration hole 168 of the stopper 166.

In this case, the flange member 156 moves forward together with the deformable member 148, and the inner case 152 moves toward the second inlet 105b within the outer case 132.

Referring to FIG. 9, the bypass hole 142 is closed by the closed end of the inner case 152, and the second openings 154 are positioned corresponding to the first openings 138. Therefore, the inside of the inner case 152 is opened.

Thus, the first and second openings 138 and 154 communicate the inside of the inner case 152 with the outside of the outer case 132, so the valve unit 130 is opened.

Then the coolant flowing into the valve unit 130, in a state that flowing into the bypass passageway 121 is prevented by closing the closed bypass hole 142, flows out through the first and second openings 138 and 154, the mounting space (S) separated by the separating plate 120, the external side of the heat dissipation unit 130, the second connecting line 113b, and the second outlet 107b.

Thus, the coolant passes through the second connecting line 113b of the heat dissipation unit 110, and the transmission oil passing through the first connecting line 113a exchanges heat with the coolant passing through the second connecting line 113b in the mounting space (S) of the housing 101. Therefore, the temperature of the transmission oil is adjusted.

The transmission oil and the coolant flow in different directions or opposite directions and exchange heat with each other because the first and second inlets 105a and 105b are formed to the upper portion or the lateral portion of the housing 101 in alternate directions. Therefore, the transmission oil exchanges heat with the coolant more efficiently.

Meanwhile, the transmission oil flows from the automatic transmission 40 into the first inlet 105a, passes the first connecting line 113a of the heat dissipation unit 110 in the mounting space (S) of the housing 101, and flows out through the first outlet 107a so as to selectively exchange heat with the coolant by the operation of the valve unit 130.

Therefore, the transmission oil, the temperature of which is raised by operation of the automatic transmission 40, is cooled through heat exchange with the coolant in the heat dissipation unit 110 of the can type of heat exchanger 100 and is then supplied to the automatic transmission 40.

That is, since the heat exchanger 100 supplies the cooled transmission oil to the automatic transmission 40 rotating at a high speed, occurrence of slip in the automatic transmission 40 is prevented.

The deformable member 148 of the valve unit 130 moves forward or backward on the fixing rod 146 according to the temperature of the coolant so as to adjust the position of the inner case 152 and simultaneously closes or opens each of the openings 138 and 154, thus the coolant flows through the bypass passageway 121, or the first and second openings 138 and 154. Accordingly, the heat exchanger 100 according to various embodiments of the present invention may control flow of the coolant passing through the heat exchanger 100.

If the can type of heat exchanger 100 according to various embodiments of the present invention is applied, the operating fluids can be warmed and cooled simultaneously, since the valve unit 130 selectively controls flowing of the operation fluid according to the temperature of the operation fluid in the running state or the initial starting condition when the operating fluids are heat-exchanged with each other. Therefore, the temperatures of the operating fluids can be controlled efficiently.

Further, since the temperatures of the operating fluids can be adjusted through the operation of the valve unit 130 according to the vehicle state and the valve unit 130 is formed as a can shape that can improve heat-exchange efficiency and reduce weight and size, it is possible to reduce fuel consumption, improve heating performance of the vehicle, simplify layout of the engine compartment, and make it easy to obtain the mounting space for parts.

The valve unit 130 applied with the deformable member 148 such as the wax material which is expanded or contracted according to the flowed operating fluid may selectively supply the operating fluids, thus flowing of the operating fluids can be correctly controlled.

Since the valve unit 130 is mounted in the can type of heat exchanger 100, additional control valves and bifurcation circuits for controlling flowing of the operating fluids can be removed. Therefore, manufacturing cost may be reduced and workability may be improved.

If the operating fluid is the transmission oil in the automatic transmission 40, hydraulic friction at cold starting may be lowered due to fast warm-up. In addition, slip may be prevented and durability may be maintained when driving due to excellent cooling performance. Therefore, fuel economy and durability of the transmission may be improved.

Further, since valve responsiveness of opening and closing according to the temperature of the operating fluids is improved, commercial value is increased.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A can type of heat exchanger comprising:
  a housing formed as a cylinder with one side closed and another side opened, having a mounting space at the inside, integrally formed with a mounting portion provided in a lateral side of the housing and connected with the mounting space, and formed with at least one inlet and at least one outlet provided in the closed one side and the lateral side respectively, of the housing;
  a heat dissipation unit mounted in the mounting space of the housing, provided with connecting lines alternately formed by stacking a plurality of plates, one of the connecting lines connected to the mounting space, receiving operating fluids from the inlet, and the operating fluids heat-exchanging with each other;
  a separating plate separating the mounting space and inside of the mounting portion, connected to the inlet formed on the mounting portion and the outlet formed on the lateral side of the housing, and forming a bypass passageway in addition to the connecting line of the heat dissipation unit; and
  a valve unit that is mounted at the inlet formed in the mounting portion and penetrates the separating plate in the mounting portion, selectively opening and closing the mounting space or the bypass passageway separated by the separating plate using linear displacement which is generated when expansion and contraction occur according to temperature of the coolant flowing from the inlet, and adjusting flow of the operating fluids.

2. The can type of heat exchanger of claim 1, wherein the inlet comprises a first inlet formed at the housing and a second inlet formed at the mounting portion, and the outlet comprises a first outlet formed at the housing and separated from the first inlet, and a second outlet formed at the lateral side of the housing and separated from the second inlet.

3. The can type of heat exchanger of claim 2, wherein the first inlet and the first outlet are respectively formed on the second inlet and the second outlet in alternate positions.

4. The can type of heat exchanger of claim 1, wherein each plate of the plurality of plates is formed with a disk shape corresponding to the housing, and one side corresponding to the separating plate is formed with a linear shape.

5. The can type of heat exchanger of claim 2, wherein, in each plate of the plurality of plates, first and second connecting holes are formed corresponding to the first inlet and the first outlet.

6. The can type of heat exchanger of claim 2, wherein, in each plate of the plurality of plates, a plurality of protrusions protrude at predetermined intervals, and a distributing protrusion is formed from a center of each plate of the plurality of plates to an exterior circumference toward the separating plate.

7. The can type of heat exchanger of claim 6, wherein each protrusion of the plurality of protrusions is formed with a hemisphere shape, and protrudes in a same direction as the distributing protrusion.

8. The can type of heat exchanger of claim 1, wherein the valve unit comprises:

an outer case inserted into the second inlet from outside of the mounting portion, the outer case including:
- a fixing member of which a mounting groove is integrally formed to an interior surface of the second inlet thereof, and is mounted to an external side of the mounting portion at an opposite side of the second inlet;
- an insert portion integrally formed to the fixing member;
- at least one first opening formed along a length direction corresponding to the mounting space separated by the separating plate; and
- at least one bypass hole formed corresponding to the bypass passageway;

a fixing rod inserted into the outer case and of which one end is fixed to the mounting groove of the fixing member;

a deformable member inserted to the fixing rod, and moved on the fixing rod by expansion or contraction according to a change of temperature of the operating fluids;

an inner case of which at least one second opening is formed along a length direction thereof corresponding to the first opening of the outer case, and which is slidably inserted into the outer case;

a flange member which is fixed to a lower portion of the inner case in the inner case, and fixed to a lower portion of the deformable member;

a stopper which is fixed to the insert portion from an opposite side of the fixing member of the outer case; and an elastic member which is interposed between the deformable member and the stopper, is compressed when the deformable member is expanded, and supplies elastic force to the deformable member.

9. The can type of heat exchanger of claim 8, wherein the fixing member of the outer case is fixed to the heat dissipation unit though a snap ring of an end cap that is mounted at an external surface of the heat dissipation unit.

10. The can type of heat exchanger of claim 8, wherein the outer case is a cylinder of which an upper end thereof is opened.

11. The can type of heat exchanger of claim 8, wherein the bypass hole and the first opening are formed apart from each other along a length direction of the outer case at a predetermined angle.

12. The can type of heat exchanger of claim 8, wherein the first openings are formed apart from the bypass hole at a lower portion of the outer case along a length direction of the outer case.

13. The can type of heat exchanger of claim 8, wherein the inner case is a cylinder of which both ends are opened.

14. The can type of heat exchanger of claim 8, wherein the second openings are formed to be misaligned along the length direction of the inner case at a predetermined angle from each other.

15. The can type of heat exchanger of claim 8, wherein the inner case is moved toward the second inlet by expansion of the deformable member in the outer case so that the second opening is positioned at the first opening to open the first opening and close the bypass hole by the inner case.

16. The can type of heat exchanger of claim 8, wherein the inner case is initially assembled as the first opening is closed by the inner case and the second opening is closed by the outer case.

17. The can type of heat exchanger of claim 8, wherein the deformable member is a wax material which is expanded or contracted according to the temperature of the operating fluids.

18. The can type of heat exchanger of claim 8, wherein flow holes are formed to an exterior circumference of the flange member with a predetermined angle.

19. The can type of heat exchanger of claim 8, wherein an exterior circumference of the flange member is fixed to an interior circumference of the inner case, and a mounting portion formed to a center thereof is fixed to the deformable member through a fixing ring.

20. The can type of heat exchanger of claim 8, wherein at least one penetration hole is formed to the stopper for the operating fluid to flow within the valve unit.

21. The can type of heat exchanger of claim 20, wherein the penetration holes are formed to a center and along a circumference of the stopper.

22. The can type of heat exchanger of claim 8, wherein a fixing end is formed to protrude to the stopper for the elastic member to be fixed under the stopper.

23. The can type of heat exchanger of claim 8, wherein a receiving portion, where the stopper is received, is formed to the outer case.

24. The can type of heat exchanger of claim 23, wherein a ring groove is formed to an upper and interior circumference of the outer case for a stopper ring to be received thereto for fixing the upper portion of the stopper.

25. The can type of heat exchanger of claim 8,
wherein one end of the elastic member is supported by the stopper and another end thereof is supported by the deformable member, and the elastic member is a coil spring.

26. The can type of heat exchanger of claim 2, wherein one of the operating fluids is a coolant flowing from a radiator, and another operating fluid is transmission oil flowing from an automatic transmission.

27. The can type of heat exchanger of claim 26,
wherein the transmission oil flows through the first inlet, the first outlet, and the heat dissipation unit, and the coolant flows through the second inlet and the second outlet, and
the connecting lines comprise a first connecting line in which the transmission oil flows and a second connecting line in which the coolant flows.

28. The can type of heat exchanger of claim 1, wherein one end of the separating plate positioned at the mounting space is bent at a predetermined angle from another end of the separating plate positioned at the mounting portion.

29. The can type of heat exchanger of claim 1, wherein, in the separating plate, a penetration hole is formed corresponding to the heat dissipation unit.

30. The can type of heat exchanger of claim 1, wherein a cover closing the mounting space is disposed on the housing.

* * * * *